(12) United States Patent
Iizuka et al.

(10) Patent No.: US 6,419,273 B1
(45) Date of Patent: Jul. 16, 2002

(54) FUEL TANK ARRANGEMENT STRUCTURE OF MOTORCYCLE

(75) Inventors: Naoshi Iizuka; Yoshiteru Kinoshita; Hiroshi Unuki, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,257

(22) Filed: Sep. 1, 2000

(30) Foreign Application Priority Data

Sep. 4, 1999 (JP) .......................................... 11-289972

(51) Int. Cl.[7] ................................................. B60P 3/22
(52) U.S. Cl. ........................................ 280/833; 280/834
(58) Field of Search ................................. 280/833, 835, 280/834, 281.1; 220/562, 86.2; 180/219

(56) References Cited

U.S. PATENT DOCUMENTS

| | | | | |
|---|---|---|---|---|
| 4,457,524 A | * | 7/1984 | Yoshiwara | 280/5 A |
| 4,660,854 A | * | 4/1987 | Suzuki et al. | 280/782 |
| 4,712,637 A | * | 12/1987 | Mogi et al. | 180/219 |
| 5,375,677 A | * | 12/1994 | Yamagiwa et al. | 180/219 |
| 6,213,514 B1 | * | 4/2001 | Natsume et al. | 280/833 |

FOREIGN PATENT DOCUMENTS

JP  U6318391  2/1988

* cited by examiner

*Primary Examiner*—Anne Marie Boehler
*Assistant Examiner*—Tony Winner
(74) *Attorney, Agent, or Firm*—Birch, Stewart, Kolasch & Birch, LLP

(57) ABSTRACT

A predetermined volume for a fuel tank and to make the fuel tank slim and further to provide a more suitable knee-grip. The rear end portion of the fuel tank is formed into an extension extending rearwardly behind the rear end portion of the main frame and is arranged under a seat and between left and right seat rails. The fuel tank is expanded under the seat. Accordingly, even if a predetermined volume is ensured for the fuel tank, the front portion of the fuel tank in front of the seat can be reduced in width, height, and length to make the fuel tank slim as a whole and, in particular, to make a knee-grip narrower to provide a most suitable riding position.

26 Claims, 2 Drawing Sheets

FUEL TANK ARRANGEMENT STRUCTURE OF MOTORCYCLE

BACKGROUND OF THE INVENTION

1. Field of the Invention

The present invention relates to a fuel tank arrangement of a motorcycle and, in particular, to a fuel tank arrangement having no effect on a riding position.

2. Description of the Background Art

One example of a fuel tank arrangement structure of a motorcycle is disclosed in Japanese Utility Model Laid-Open No. 63-18391/1988A. The motorcycle includes a pair of left and right main frames extending obliquely downwardly and rearwardly from a head pipe. A pair of left and right seat rails extend obliquely upwardly and rearwardly from the rear ends of the pair of left and right main frames. A fuel tank is supported on the main frames, and a seat is supported on the seat rails at the back of the fuel tank. The front ends of the seat rails are connected to the middle portions of the main frames, and the fuel tank is located on both the main frames and seat rails. The fuel tank is supported by the front portion of the seat to hold the position of the rear side of the fuel tank nearly horizontal.

In this connection, the fuel tank tends to be increased in width, height, and length to ensure a predetermined volume, which results in increasing the size of the vehicle body. However, the fuel tank of a motorcycle needs to have, at its rear portion, a knee-grip portion which a rider grips with his knees. Hence it is necessary to ensure that the fuel tank permits a riding position where the rider easily grips the fuel tank with his knees. However, the above fuel tank having an increased size cannot fulfill the above requirements, and sometimes has a negative effect on the riding position of the rider. For this reason, it is the object of the present invention to solve the above problem.

SUMMARY OF THE INVENTION

It is therefore an object of the present invention to provide a fuel tank arrangement structure of a motorcycle having a pair of left and right main frames extending obliquely downwardly and rearwardly from a head portion at the front end, and a pair of left and right seat rails extending obliquely upwardly and rearwardly from the rear end portions of the main frames.

A fuel tank is supported on the main frames, and a seat is supported on the seat rails behind the fuel tank. In the present invention, the rear end portion of the fuel tank is formed into an extension extending rearwardly behind the rear end portions of the main frames. The extension of the fuel tank has a narrower width than a main body of the fuel tank, and is arranged under the seat and between the left and right seat rails. This enables the volume of the fuel tank to expand into the extension under the seat, which can reduce the width, the height and the length of the front portion of the fuel tank in front of the seat, while ensuring a predetermined volume of the fuel tank.

As a result, the narrower width of the fuel tank located forwardly of the seat makes it easier for a rider to grip the tank with his knees and to assume a good riding position. Further, the fuel tank extension arranged under the seat can lower the center of gravity of the vehicle body. In addition, the seat rails act as the members protecting the extension.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
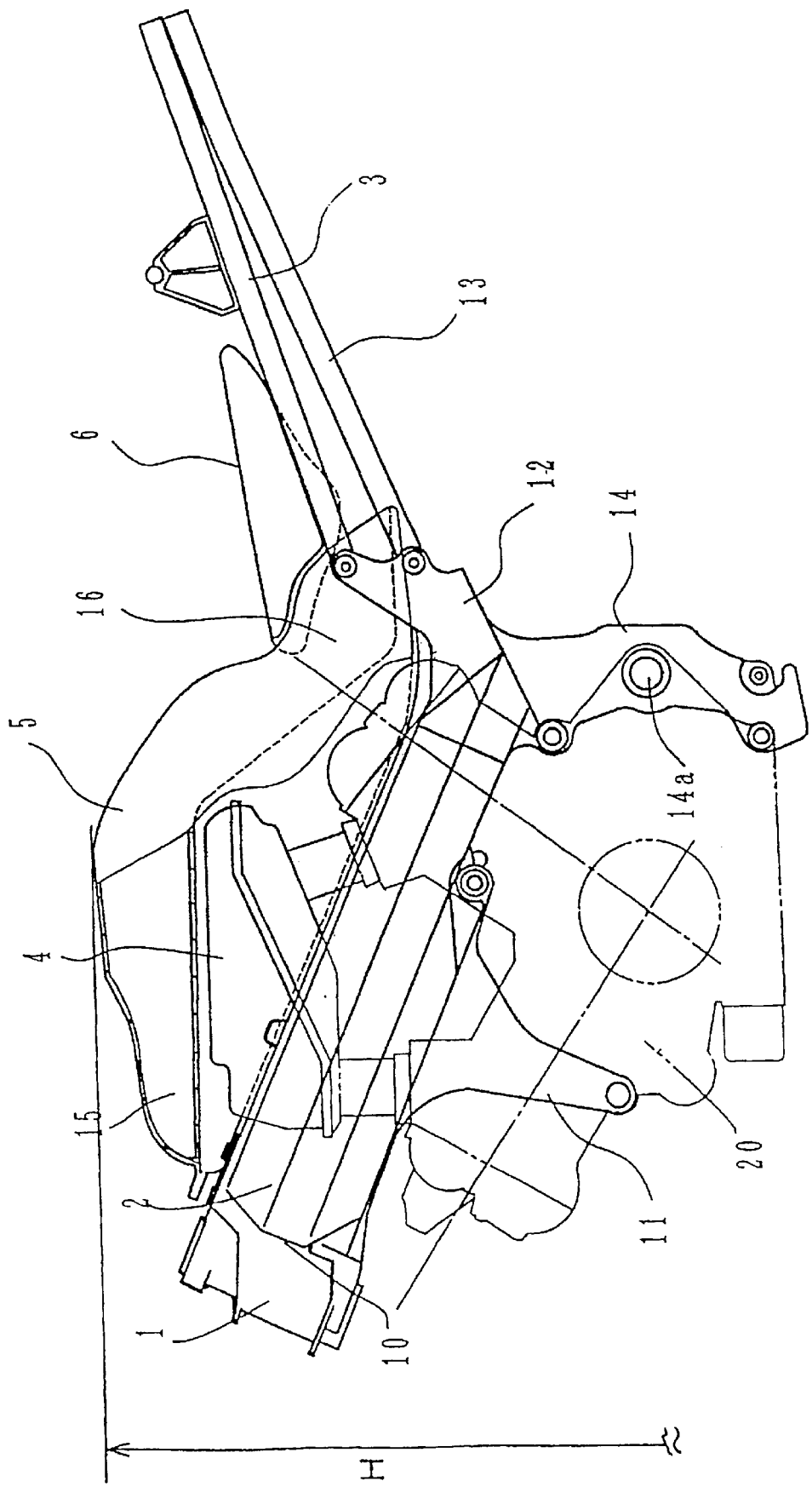
FIG. 1 is a side view of a main portion of a vehicle body in accordance with the preferred embodiment.

A preferred embodiment of the invention will now be described with reference to the drawings. As is evident from the drawings, a vehicle body frame has a head box 1 located at the front end portion, and a pair of left and right main frames 2 bifurcating from the head box 1 to the left and right sides and extending obliquely downwardly and rearwardly from the head box 1. A pair of left and right seat rails 3 extend obliquely upwardly and rearwardly from the rear end portions of the main frames. An air cleaner 4 is received in a space between the left and right main frames 2 and is supported by the main frames 2. A fuel tank 5 is supported on the main frames 2 such the front center portion of the bottom of the fuel tank is raised to form an air cleaner receiving cavity. A seat 6 is supported on the left and right seat rails 3.

The head box 1 is a hollow part made by casting. The head box 1 has a square-cornered cylindrical passage part 7 projecting forwardly in the center of the vehicle body and a front end opening 8 for introducing outside air. A cylindrical part (not shown) extending up and down is mounted in the center of the passage part 7, and a shaft (not shown) for steering a front wheel is inserted in and turnably supported by a steering coaxial hole 9 passing up and down through the cylindrical part.

An arm part 10 is mounted at the rear portion of the head box 1 and extends rearwardly to the left and right sides. The arm part 10 is connected to front end portions of the left and right main frames 2 and supplies outside air passing the passage part 7 to the air cleaner 4 through a communication port made in the rear end wall.

The left and right main frames 2 are well known members which are made by extruding a suitable material such as aluminum alloy and are shaped like a square-cornered cylinder. The left and right main frames 2 are provided with extending engine hangers 11 at the middle portions of their lower sides, and a pair of left and right seat rail stays 12 projecting obliquely upward at their rear end portions. The tip ends of the seat rail stays 12 are connected to the front end portions of pipe-like seat rails 3.

The front end portion of a reinforcing pipe 13 is fixed to each seat rail stay 12 at a position below the connecting point of the seat rail stay 12 and the seat rail 3. The reinforcing pipe 13 extends rearwardly below the seat rail 3. The rear end portion of the reinforcing pipe 13 and the rear end portion of seat rail 3 are integrally connected to each other. A pivot frame 14 depends from the bottom end portion of each seat rail stay 12, and the pivot part 14a at the middle portion of the pivot frame supports a rear arm (not shown) such that it can freely oscillate and supports a V-type 4-cycle engine 20 with the engine hanger 11.

The bottom of the fuel tank 5 extends along the entire length of the top surfaces of the main frames 2. The front portion 15 of the bottom of the fuel tank 5 is raised at its center in the width direction to ensure a space for receiving the air cleaner 4. The rear end portion of the fuel tank 5 forms an extension 16 positioned at a lower level when viewed from the side as shown in FIG. 1. The extension extends rearwardly over the seat rail stays 12 and overlaps the seat rails 3 at its left and right sides and finally extends to the position under the seat 6.

Figure 2:
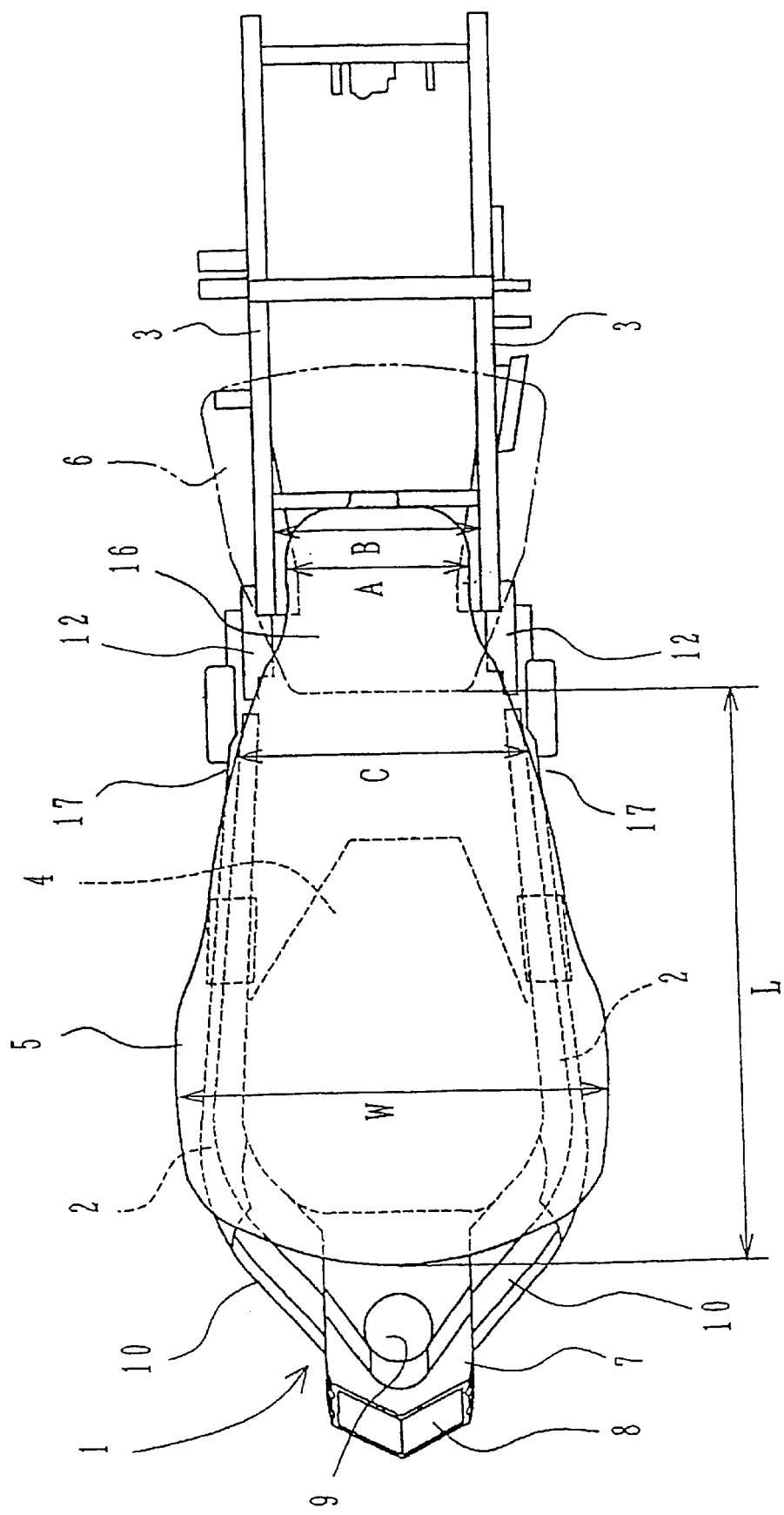
FIG. 2 is a plan view of the main portion of a vehicle body in accordance with the preferred embodiment showing the fuel tank and its extension.

When the extension 16 is viewed from the top as shown in FIG. 2, a width A is slightly narrower than a width B between the left and right seat rails 3, and the extension 16 is sandwiched laterally by the front portions of the seat rails 3 and front portions of the reinforcing pipes 13. Also, the extension 16 is laterally sandwiched between the left and right seat rail stays 12 forwardly of the seat rails 3. Accordingly, the extension 16 is sandwiched by the seat rail stays 12 and the seat rails 3 at its left and right sides.

Both sides of the extension 16 and the rear end portion of the fuel tank 5 near the front end of the seat 6 form a knee-grip portion 17 having a width C. The width C of the knee-grip portion 17 is larger than the width A and the width B, and is smaller than the maximum width W described later of the fuel tank, and provides a size which produces the most suitable riding position.

The fuel tank 5 is designed to have a predetermined volume and is pivotably supported by the seat rail stays 12 at the rear end portion. When the air cleaner 4 and the like needs to be maintained, the front end side of the fuel tank 5 is lifted to provide a space between the left and right main frames 2.

Next, the action of the present preferred embodiment will be described. As shown in FIGS. 1 and 2, since the fuel tank 5 is provided with the extension 16 at the rear end portion thereof which extends over the rear end portions of the main frames 2 and under the seat 6, the fuel tank 5 can be expanded below the seat 6 and hence, even if the predetermined volume of the fuel tank 5 is ensured, the volume of the front portion forwardly of the seat 6 can be reduced by the volume of the expanded extension 16. This can reduce the size of the front portion, and the width of the front portion is reduced toward the extension 16 from the maximum width W and is smaller at every position than the conventional fuel tank.

In particular, the knee-grip portion 17 is narrower than usual and most suitable for the riding position. Also, the length L between the front end of the fuel tank 5 and the front end of the seat 6 can be reduced. Finally, the height H between the ground level and the highest point of the fuel tank 5 can be reduced. Accordingly, in the case where the width and the length of the fuel tank 5 are made nearly equal to those of the conventional fuel tank, the fuel tank 5 can be easily increased in volume, and in the case where the fuel tank 5 is made to have the same volume as the conventional fuel tank, the fuel tank 5 can be made slim at the front portion before the seat 6, which results in increasing flexibility in designing the fuel tank.

Also, since the extension 16 is under the seat 6 and the rear bottom surface of the fuel tank 5 extends obliquely along the top surfaces of the main frames 2, it is possible to concentrate the mass of the fuel tank 5 on the center of gravity and hence to lower the position of the center of gravity and to control the movement of the center of gravity caused by the variation of fuel within a small range.

Further, even though the air cleaner 4 is arranged under the fuel tank 5, the front portion 15 of the fuel tank 5 above the air cleaner 4 can be reduced in thickness and, hence, it is easy to ensure sufficient space for arranging the air cleaner 4 and to increase the capacity of the air cleaner 4. Accordingly, this fuel tank arrangement structure is most suitable for a vehicle having this type of air cleaner arrangement.

As shown in FIG. 1, a vertical thickness (or height) of the extension 16, measured at a location of the maximum width of the extension 16, is less than one-half of a maximum vertical thickness of a main body portion 5 of the fuel tank. As shown in FIG. 2, portions of side walls of the extension 16 extend substantially parallel to one another and to a longitudinal axis of the motorcycle, and substantially parallel to the left and right seat rails 3. These portions of the side walls constitute a majority of a length of the extension 16.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fuel tank arrangement structure of a motorcycle comprising:
   a pair of left and right main frames extending obliquely downwardly and rearwardly from a head portion;
   a pair of left and right seat rails extending obliquely upwardly and rearwardly from rear end portions of the main frames;
   a fuel tank supported on the main frames; and
   a seat supported on the seat rails behind the fuel tank,
   wherein the rear end portion of the fuel tank is formed into an extension extending rearwardly behind the rear end portions of the main frames and having a width narrower than a width of a main body of the fuel tank, the extension being arranged under the seat and between the left and right seat rails.

2. The fuel tank arrangement as set forth in claim 1, wherein a vertical thickness of the extension, measured at a location of a maximum width of the extension, is less than one-half of a maximum vertical thickness of the main body.

3. The fuel tank arrangement as set forth in claim 1, wherein portions of side walls of the extension extend substantially parallel to a longitudinal axis of the motorcycle.

4. The fuel tank arrangement as set forth in claim 3, wherein the portions of the side walls constitute a majority of a length of the extension.

5. The fuel tank arrangement as set forth in claim 1, wherein portions of side walls of the extension extend substantially parallel to the left and right seat rails.

6. The fuel tank arrangement as set forth in claim 1, wherein portions of side walls of the extension extend substantially parallel to one another.

7. The fuel tank arrangement as set forth in claim 1, wherein side walls of the extension extend substantially parallel to one another and to a longitudinal axis of the motorcycle.

8. The fuel tank arrangement as set forth in claim 7, wherein a vertical thickness of the extension, measured at a location of a maximum width of the extension, is less than one-half of a maximum vertical thickness of the main body.

9. The fuel tank arrangement as set forth in claim 8, wherein the side walls of the extension extend substantially parallel to the left and right seat rails.

10. The fuel tank arrangement as set forth in claim 1, wherein said fuel tank has a bottom, and said bottom of said fuel tank at said extension is positioned at a lower level than said bottom of said fuel tank at said main body.

11. The fuel tank arrangement as set forth in claim 10, wherein said bottom of said fuel tank extends along substantially an entire length of top surfaces of said left and right main frames.

12. The fuel tank arrangement as set forth in claim 11, wherein a front center portion of said bottom is raised to form an air cleaner receiving cavity.

13. A fuel tank arrangement of a motorcycle, said motorcycle including a pair of left and right main frames extending obliquely downwardly and rearwardly from a head portion, a pair of left and right seat rails extending obliquely upwardly and rearwardly from rear end portions of the main frames, and a seat supported on the left and right seat rails, the fuel tank arrangement comprising:
 a fuel tank supported on the main frames, said fuel tank including:
  a main body portion located forwardly of the seat, the main body portion having a maximum width; and
  an extension portion extending rearwardly of the main body portion of the fuel tank, the extension portion extending rearwardly behind the rear end portions of the main frames, the extension portion having a maximum width which is narrower than the maximum width of the main body portion of the fuel tank, and the extension portion being arranged under the seat and between the left and right seat rails.

14. The fuel tank arrangement as set forth in claim 13, wherein a vertical thickness of the extension portion, measured at a location of the maximum width of the extension portion, is less than one-half of a maximum vertical thickness of the main body portion.

15. The fuel tank arrangement as set forth in claim 13, wherein portions of side walls of the extension portion extend substantially parallel to a longitudinal axis of the motorcycle.

16. The fuel tank arrangement as set forth in claim 15, wherein the portions of the side walls constitute a majority of a length of the extension portion.

17. The fuel tank arrangement as set forth in claim 13, wherein portions of side walls of the extension portion extend substantially parallel to the left and right seat rails.

18. The fuel tank arrangement as set forth in claim 11, wherein the portions of the side walls constitute a majority of a length of the extension portion.

19. The fuel tank arrangement as set forth in claim 13, wherein portions of side walls of the extension portion extend substantially parallel to one another.

20. The fuel tank arrangement as set forth in claim 19, wherein the portions of the side walls constitute a majority of a length of the extension portion.

21. The fuel tank arrangement as set forth in claim 13, wherein side walls of the extension portion extend substantially parallel to one another and to a longitudinal axis of the motorcycle.

22. The fuel tank arrangement as set forth in claim 21, wherein a vertical thickness of the extension portion, measured at a location of the maximum width of the extension portion, is less than one-half of a maximum vertical thickness of the main body portion.

23. The fuel tank arrangement as set forth in claim 22, wherein the side walls of the extension portion extend substantially parallel to the left and right seat rails.

24. The fuel tank arrangement as set forth in claim 13, wherein said fuel tank has a bottom, and said bottom of said fuel tank at said extension is positioned at a lower level than said bottom of said fuel tank at said main body.

25. The fuel tank arrangement as set forth in claim 24, wherein said bottom of said fuel tank extends along substantially an entire length of top surfaces of said left and right main frames.

26. The fuel tank arrangement as set forth in claim 25, wherein a front center portion of said bottom is raised to form an air cleaner receiving cavity.

* * * * *